(12) United States Patent
Carin et al.

(10) Patent No.: US 7,694,523 B2
(45) Date of Patent: Apr. 13, 2010

(54) CONTROL SYSTEM FOR GAS TURBINE IN MATERIAL TREATMENT UNIT

(75) Inventors: Christianne Carin, Priddis (CA); Brian N. Gorbell, Priddis (CA); Christianne Carin, legal representative, Priddis (CA); Alvin W. Fedkenheuer, Calgary (CA); John S. Jonasson, Tisdale (CA); Alexander Starosud, Calgary (CA)

(73) Assignee: Earthrenew, Inc., Half Moon Bay, CA (US)

( * ) Notice: Subject to any disclaimer, the term of this patent is extended or adjusted under 35 U.S.C. 154(b) by 435 days.

(21) Appl. No.: 10/894,875

(22) Filed: Jul. 19, 2004

(65) Prior Publication Data

US 2006/0010708 A1   Jan. 19, 2006

(51) Int. Cl.
*F02C 7/00* (2006.01)
*F02G 3/00* (2006.01)
*F26B 3/00* (2006.01)
*F26B 13/10* (2006.01)

(52) U.S. Cl. .......................... 60/783; 60/39.27; 34/446; 34/575

(58) Field of Classification Search ................... 60/783, 60/37.27; 34/576, 86, 90, 573, 575, 446
See application file for complete search history.

(56) References Cited

U.S. PATENT DOCUMENTS

| | | |
|---|---|---|
| 3,050,383 A | 8/1962 | Wilson |
| 3,262,214 A | 7/1966 | Webb |
| 3,269,824 A | 8/1966 | Aswell |
| 3,285,704 A * | 11/1966 | Sackett, Sr. .................. 422/209 |
| 3,463,612 A * | 8/1969 | Whitsel, Jr. .................. 423/450 |
| 3,564,723 A | 2/1971 | Passey et al. |
| 3,589,313 A | 6/1971 | Smith et al. |
| 3,645,006 A | 2/1972 | Anderson |

(Continued)

FOREIGN PATENT DOCUMENTS

CH        641891        3/1984

(Continued)

OTHER PUBLICATIONS

Combined Heat and Power Quality Assurance Programme: Guidance Note 11 (2003); Guidance Note 12 (2003); Guidance Note 16 (2004); Appendix 3 (2000), www.chpqa.com.

(Continued)

*Primary Examiner*—Charles G Freay
(74) *Attorney, Agent, or Firm*—Merchant & Gould P.C.

(57) ABSTRACT

This invention discloses systems and methods for control of a gas turbine or a gas turbine generator, where the gas turbine is connected to a dryer vessel in which gas turbine exhaust gases are used to heat treat a material in the dryer vessel. The control system comprises one or more sensors for temperature, moisture and/or flow rate in the dryer vessel and/or of the material inside, entering and/or exiting the dryer vessel and a controller responsive to the sensor for controlling the fuel and/or air flow into the gas turbine. This control system and method enables providing the appropriate heat output from the gas turbine to meet the process heat required for the desired material treatment. Optionally, the gas turbine can be a liquid fuel turbine engine, or a reciprocating engine can be substituted for the turbine engine.

8 Claims, 1 Drawing Sheet

U.S. PATENT DOCUMENTS

| | | |
|---|---|---|
| 3,667,131 A | 6/1972 | Stephanoff |
| 3,668,785 A | 6/1972 | Rodwin |
| 3,783,527 A * | 1/1974 | Driscoll et al. ................. 34/575 |
| 3,805,715 A | 4/1974 | Keller |
| 3,866,411 A | 2/1975 | Marion et al. |
| 3,868,817 A | 3/1975 | Marion et al. |
| 3,905,796 A | 9/1975 | Ghelfi |
| 3,926,743 A | 12/1975 | Cywin |
| 3,997,388 A | 12/1976 | Simon |
| 4,007,786 A | 2/1977 | Schlinger |
| 4,028,030 A | 6/1977 | Imhof |
| 4,075,831 A | 2/1978 | McGann |
| 4,082,532 A | 4/1978 | Imhof |
| 4,099,336 A | 7/1978 | Maffet |
| 4,121,349 A | 10/1978 | Maffet |
| 4,121,912 A | 10/1978 | Barber et al. |
| 4,128,946 A | 12/1978 | Maffet |
| 4,132,065 A | 1/1979 | McGann |
| 4,137,648 A | 2/1979 | Rhodes |
| 4,164,124 A | 8/1979 | Taylor et al. |
| 4,184,322 A | 1/1980 | Paull et al. |
| 4,220,463 A | 9/1980 | Van Hijfte et al. |
| 4,247,302 A | 1/1981 | Woldy et al. |
| 4,248,604 A | 2/1981 | Woldy et al. |
| 4,255,232 A | 3/1981 | Ries |
| 4,353,207 A | 10/1982 | Lee |
| 4,402,710 A | 9/1983 | Stellaccio |
| 4,436,531 A | 3/1984 | Estabrook et al. |
| 4,454,427 A | 6/1984 | Sosnowski et al. |
| 4,469,488 A | 9/1984 | Calderon |
| 4,546,502 A * | 10/1985 | Lew ................................ 4/449 |
| 4,571,949 A | 2/1986 | Moke |
| 4,682,985 A | 7/1987 | Kohl |
| 4,692,172 A | 9/1987 | Stellaccio et al. |
| 4,725,380 A | 2/1988 | Pinto |
| 4,733,528 A | 3/1988 | Pinto |
| 4,743,287 A | 5/1988 | Robinson |
| 4,745,868 A * | 5/1988 | Seabury ...................... 110/234 |
| 4,766,823 A | 8/1988 | Seabury |
| 4,776,860 A | 10/1988 | Najjar et al. |
| 4,778,484 A | 10/1988 | Najjar et al. |
| 4,819,571 A | 4/1989 | Hallett |
| 4,832,831 A | 5/1989 | Meyer et al. |
| 4,842,615 A | 6/1989 | Meyer et al. |
| 4,881,366 A | 11/1989 | Nurse |
| 4,898,107 A | 2/1990 | Dickinson |
| 4,900,429 A | 2/1990 | Richardson |
| 4,927,430 A | 5/1990 | Calderon |
| 4,953,479 A | 9/1990 | Keller et al. |
| 4,957,049 A | 9/1990 | Strohmeyer, Jr. |
| 4,957,544 A | 9/1990 | Najjar |
| 4,971,601 A | 11/1990 | Najjar et al. |
| 4,997,469 A | 3/1991 | Moore |
| 4,999,992 A | 3/1991 | Nurse |
| 4,999,995 A | 3/1991 | Nurse |
| 5,000,099 A | 3/1991 | Dickinson |
| 5,048,284 A | 9/1991 | Lywood et al. |
| 5,079,852 A | 1/1992 | Nakayama et al. |
| 5,083,870 A | 1/1992 | Sindelar et al. |
| 5,113,597 A | 5/1992 | Sylla |
| 5,117,623 A | 6/1992 | Arundale |
| 5,132,007 A | 7/1992 | Meyer et al. |
| 5,134,944 A | 8/1992 | Keller et al. |
| 5,142,794 A | 9/1992 | Meiners |
| 5,201,172 A | 4/1993 | Hakulin et al. |
| 5,211,724 A | 5/1993 | Khan et al. |
| 5,230,211 A | 7/1993 | McMahon et al. |
| 5,251,433 A | 10/1993 | Wallace |
| 5,295,350 A | 3/1994 | Child et al. |
| 5,319,924 A | 6/1994 | Wallace et al. |
| 5,343,632 A | 9/1994 | Dinh |
| 5,345,693 A | 9/1994 | Skjold |
| 5,345,756 A | 9/1994 | Jahnke et al. |
| 5,354,349 A | 10/1994 | Inoue |
| 5,388,395 A | 2/1995 | Scharpf et al. |
| 5,393,317 A | 2/1995 | Robinson |
| 5,394,686 A | 3/1995 | Child et al. |
| 5,401,282 A | 3/1995 | Leininger et al. |
| 5,403,366 A | 4/1995 | Leininger et al. |
| 5,428,906 A | 7/1995 | Lynam et al. |
| 5,466,273 A | 11/1995 | Connell |
| 5,471,937 A | 12/1995 | Kosky et al. |
| 5,474,686 A | 12/1995 | Barr |
| 5,485,728 A | 1/1996 | Dickinson |
| 5,535,528 A | 7/1996 | Finkam |
| 5,557,873 A * | 9/1996 | Lynam et al. .................. 34/379 |
| 5,570,517 A | 11/1996 | Lujer |
| 5,584,171 A | 12/1996 | Sato et al. |
| 5,588,222 A | 12/1996 | Thompson |
| 5,592,811 A | 1/1997 | Dodge et al. |
| 5,596,815 A | 1/1997 | Rice et al. |
| 5,626,638 A | 5/1997 | Valkanas |
| 5,636,507 A * | 6/1997 | Rajamani et al. ............... 60/773 |
| 5,650,127 A | 7/1997 | Campbell et al. |
| 5,653,872 A | 8/1997 | Cohan |
| 5,676,729 A | 10/1997 | Elrod et al. |
| 5,685,153 A | 11/1997 | Dickinson et al. |
| 5,724,805 A | 3/1998 | Golomb et al. |
| 5,740,667 A | 4/1998 | Bhattacharyya et al. |
| 5,746,006 A | 5/1998 | Duske et al. |
| 5,767,584 A | 6/1998 | Gore et al. |
| 5,865,023 A | 2/1999 | Sorensen et al. |
| 5,866,752 A | 2/1999 | Goozner |
| 5,888,389 A | 3/1999 | Griffith et al. |
| 5,983,521 A | 11/1999 | Thompson |
| 6,006,440 A | 12/1999 | Wiesenhofer et al. |
| 6,029,370 A | 2/2000 | Cromeens |
| 6,039,774 A | 3/2000 | McMullen et al. |
| 6,114,400 A | 9/2000 | Nataraj et al. |
| 6,125,633 A | 10/2000 | Strohmeyer, Jr. |
| 6,141,796 A | 11/2000 | Cummings |
| 6,155,212 A | 12/2000 | McAlister |
| 6,159,263 A | 12/2000 | Greer et al. |
| 6,171,499 B1 | 1/2001 | Bouchalat |
| 6,173,508 B1 | 1/2001 | Strohmeyer, Jr. |
| 6,189,234 B1 | 2/2001 | Luker |
| 6,197,081 B1 | 3/2001 | Schmidt |
| 6,218,173 B1 | 4/2001 | Naito |
| 6,230,480 B1 | 5/2001 | Rollins, III |
| 6,233,844 B1 | 5/2001 | Gallego Juarez et al. |
| 6,237,337 B1 | 5/2001 | Bronicki et al. |
| 6,250,236 B1 | 6/2001 | Feizollahi |
| 6,277,894 B1 | 8/2001 | Agee et al. |
| 6,293,121 B1 | 9/2001 | Labrador |
| 6,293,985 B1 | 9/2001 | Phinney |
| 6,321,539 B1 | 11/2001 | Bronicki et al. |
| 6,325,837 B1 | 12/2001 | Lentz |
| 6,327,994 B1 | 12/2001 | Labrador |
| 6,350,394 B1 | 2/2002 | Ennis et al. |
| 6,355,456 B1 | 3/2002 | Hallberg et al. |
| 6,367,163 B1 | 4/2002 | Luker |
| 6,393,821 B1 | 5/2002 | Prabhu |
| 6,398,851 B1 | 6/2002 | Bose |
| 6,419,856 B1 | 7/2002 | Cirrito et al. |
| 6,446,385 B1 | 9/2002 | Crutcher |
| 6,451,589 B1 | 9/2002 | Dvorak |
| 6,461,399 B1 | 10/2002 | Connell |
| 6,471,898 B1 | 10/2002 | Barre et al. |
| 6,484,417 B2 | 11/2002 | Tedman et al. |
| 6,494,045 B2 | 12/2002 | Rollins, III |
| 6,497,741 B2 | 12/2002 | Sower |
| 6,502,402 B1 | 1/2003 | Smith et al. |
| 6,505,467 B1 | 1/2003 | Fjellhaug et al. |
| 6,506,311 B2 | 1/2003 | DeGarmo et al. |

| | | | | | |
|---|---|---|---|---|---|
| 6,510,695 B1 | 1/2003 | Fisher | 2003/0089151 A1 | 5/2003 | Logan et al. |
| 6,517,600 B1 | 2/2003 | Dinel | 2003/0098227 A1 | 5/2003 | Okamoto et al. |
| 6,524,632 B2 | 2/2003 | Kartchner | 2003/0110693 A1 | 6/2003 | Drnevich et al. |
| 6,534,105 B2 | 3/2003 | Kartchner | 2003/0111410 A1 | 6/2003 | Branson |
| 6,554,061 B2 | 4/2003 | Jukkola et al. | 2003/0136165 A1 | 7/2003 | Logan et al. |
| 6,578,354 B2 | 6/2003 | Hatamiya et al. | 2003/0150215 A1 | 8/2003 | Rollins, III |
| 6,584,936 B2 | 7/2003 | Rivard | 2004/0011057 A1 | 1/2004 | Huber |
| 6,588,212 B1 | 7/2003 | Wallace et al. | 2004/0025715 A1 | 2/2004 | Bonde et al. |
| 6,588,504 B2 | 7/2003 | Wellington et al. | 2004/0031256 A1 | 2/2004 | Rollins, III |
| 6,596,780 B2 | 7/2003 | Jahnke et al. | 2004/0040174 A1 | 3/2004 | Childs |
| 6,606,848 B1 | 8/2003 | Rollins, III | 2004/0045682 A1 | 3/2004 | Liprie |
| 6,613,562 B2 | 9/2003 | Dvorak | 2004/0050069 A1 | 3/2004 | Willems et al. |
| 6,615,589 B2 | 9/2003 | Allam et al. | 2004/0055517 A1 | 3/2004 | Nunemacher |
| 6,623,546 B1 | 9/2003 | Bourdel | 2004/0055716 A1 | 3/2004 | Landalv et al. |
| 6,629,414 B2 | 10/2003 | Fischer | 2004/0060277 A1 | 4/2004 | Hatamiya et al. |
| 6,638,757 B2 | 10/2003 | Teran et al. | 2004/0081614 A1 | 4/2004 | Ying et al. |
| 6,645,267 B1 | 11/2003 | Dinel | 2004/0087011 A1 | 5/2004 | Dvorak |
| 6,682,578 B2 | 1/2004 | Sower | 2004/0103068 A1 | 5/2004 | Eker et al. |
| 6,694,738 B2 | 2/2004 | Bronicki et al. | 2004/0154184 A1 * | 8/2004 | Bloemendaal ............... 34/391 |
| 6,716,360 B2 | 4/2004 | Titmas | 2004/0170210 A1 | 9/2004 | Do et al. |
| 6,722,845 B2 | 4/2004 | Chard et al. | 2004/0182000 A1 | 9/2004 | Mansour et al. |
| 6,745,573 B2 | 6/2004 | Marin et al. | 2004/0194337 A1 | 10/2004 | Gasparini et al. |
| 6,748,743 B1 | 6/2004 | Foster-Pegg | 2004/0211569 A1 | 10/2004 | Vinegar et al. |
| 6,756,140 B1 | 6/2004 | McAlister | 2004/0261285 A1 | 12/2004 | Harada |
| 6,790,349 B1 | 9/2004 | Sawyer | 2005/0072343 A1 | 4/2005 | Fung et al. |
| 6,792,759 B2 | 9/2004 | Rollins, III | 2005/0113467 A1 | 5/2005 | Branson |
| 6,793,704 B2 | 9/2004 | You | 2005/0120715 A1 | 6/2005 | Labrador |
| 6,824,682 B2 | 11/2004 | Branson | 2005/0144961 A1 | 7/2005 | Colibaba-Evulet et al. |
| 6,846,343 B2 | 1/2005 | Sower | 2005/0150230 A1 | 7/2005 | Rollins, III |
| 6,854,279 B1 | 2/2005 | Digiovanni et al. | 2005/0153410 A1 | 7/2005 | Hallberg et al. |
| 6,880,263 B2 | 4/2005 | Gasparini et al. | 2005/0217134 A1 | 10/2005 | Lasonde |
| 6,895,760 B2 | 5/2005 | Kesseli | 2005/0238548 A1 | 10/2005 | van Egmond et al. |
| 6,923,004 B2 | 8/2005 | Chandran et al. | 2006/0010712 A1 | 1/2006 | Carin et al. |
| 6,944,967 B1 | 9/2005 | Staples | 2006/0010714 A1 | 1/2006 | Carin et al. |
| 6,948,319 B2 | 9/2005 | Hayakawa et al. | 2006/0096163 A1 | 5/2006 | Dickinson et al. |
| RE38,815 E | 10/2005 | Maese et al. | 2006/0096298 A1 | 5/2006 | Barnicki et al. |
| 6,978,725 B2 | 12/2005 | Ramharter et al. | 2006/0101665 A1 | 5/2006 | Carin et al. |
| 6,981,994 B2 | 1/2006 | Drnevich et al. | 2006/0101881 A1 | 5/2006 | Carin et al. |
| 6,987,792 B2 | 1/2006 | Do et al | 2006/0112639 A1 | 6/2006 | Nick et al. |
| 7,024,796 B2 * | 4/2006 | Carin et al. ................. 34/363 | 2006/0123657 A1 | 6/2006 | Tada et al. |
| 7,024,800 B2 * | 4/2006 | Carin et al. ................. 34/576 | 2006/0201024 A1 | 9/2006 | Carin et al. |
| 7,041,272 B2 | 5/2006 | Keefer et al. | 2006/0211777 A1 | 9/2006 | Severinsky |
| 7,055,325 B2 | 6/2006 | Wolken | 2006/0240369 A1 | 10/2006 | Duesel, Jr. et al. |
| 7,078,229 B2 | 7/2006 | Dvorak | 2006/0254079 A1 | 11/2006 | Carin et al. |
| 7,087,652 B2 | 8/2006 | Abbott et al. | 2006/0254080 A1 | 11/2006 | Carin et al. |
| 7,105,088 B2 | 9/2006 | Schien et al. | 2006/0254081 A1 | 11/2006 | Carin et al. |
| 7,131,259 B2 | 11/2006 | Rollins, III | 2006/0260190 A1 | 11/2006 | Miyoshi et al. |
| 7,162,875 B2 | 1/2007 | Fletcher et al. | 2007/0007198 A1 | 1/2007 | Balvanz |
| 7,169,821 B2 | 1/2007 | Branson | 2007/0045265 A1 | 3/2007 | McKinzie, II |
| 7,232,937 B2 | 6/2007 | Bushuev | 2007/0045266 A1 | 3/2007 | Sandberg et al. |
| 7,279,655 B2 | 10/2007 | Blutke et al. | 2007/0045267 A1 | 3/2007 | Vinegar et al. |
| 7,282,189 B2 | 10/2007 | Zauderer | 2007/0045268 A1 | 3/2007 | Vinegar et al. |
| 7,334,345 B2 | 2/2008 | Lasonde | 2007/0084077 A1 | 4/2007 | Gorbell et al. |
| 7,354,562 B2 | 4/2008 | Ying et al. | 2007/0095046 A1 | 5/2007 | Wallace |
| 7,375,142 B2 | 5/2008 | Pearson | 2007/0095536 A1 | 5/2007 | Vinegar et al. |
| 7,381,550 B2 | 6/2008 | Hallberg et al. | 2007/0095537 A1 | 5/2007 | Vinegar |
| 7,395,670 B1 | 7/2008 | Drnevich et al. | 2007/0108200 A1 | 5/2007 | McKinzie, II et al. |
| 7,404,891 B2 | 7/2008 | Van Egmond et al. | 2007/0108201 A1 | 5/2007 | Vinegar et al. |
| 7,435,037 B2 | 10/2008 | McKinzie, II | 2007/0114173 A1 | 5/2007 | Dvorak |
| 7,452,392 B2 | 11/2008 | Nick et al. | 2007/0119098 A1 | 5/2007 | Diaz et al. |
| 7,487,601 B2 | 2/2009 | Carin et al. | 2007/0125533 A1 | 6/2007 | Minderhoud et al. |
| 7,500,528 B2 | 3/2009 | McKinzie, II et al. | 2007/0127897 A1 | 6/2007 | John et al. |
| 7,547,390 B2 | 6/2009 | McCorkle | 2007/0131415 A1 | 6/2007 | Vinegar et al. |
| 2001/0023576 A1 | 9/2001 | Rollins, III | 2007/0131419 A1 | 6/2007 | Maria Roes et al. |
| 2001/0047040 A1 | 11/2001 | Agee et al. | 2007/0131420 A1 | 6/2007 | Mo et al. |
| 2002/0046561 A1 | 4/2002 | Bronicki et al. | 2007/0131427 A1 | 6/2007 | Li et al. |
| 2002/0098394 A1 | 7/2002 | Keefer et al. | 2007/0131428 A1 | 6/2007 | den Boestert et al. |
| 2002/0114866 A1 | 8/2002 | Kartchner | 2007/0133959 A1 | 6/2007 | Vinegar et al. |
| 2002/0121092 A1 | 9/2002 | Allam et al. | 2007/0133960 A1 | 6/2007 | Vinegar et al. |
| 2002/0122850 A1 | 9/2002 | Kartchner | 2007/0133961 A1 | 6/2007 | Fairbanks et al. |
| 2002/0166323 A1 | 11/2002 | Marin et al. | 2007/0137856 A1 | 6/2007 | McKinzie et al. |
| 2003/0038078 A1 | 2/2003 | Stamper et al. | 2007/0137857 A1 | 6/2007 | Vinegar et al. |
| 2003/0083391 A1 | 5/2003 | Jahnke et al. | 2007/0144732 A1 | 6/2007 | Kim et al. |

| | | | |
|---|---|---|---|
| 2007/0163142 | A1 | 7/2007 | Carin et al. |
| 2007/0163316 | A1 | 7/2007 | Fedkenheuer et al. |
| 2007/0204623 | A1 | 9/2007 | Rollins, III |
| 2007/0221377 | A1 | 9/2007 | Vinegar et al. |
| 2008/0017370 | A1 | 1/2008 | Vinegar et al. |
| 2008/0028634 | A1 | 2/2008 | Leahy |
| 2008/0104858 | A1 | 5/2008 | Carin et al. |
| 2008/0105019 | A1 | 5/2008 | Carin et al. |
| 2008/0107577 | A1 | 5/2008 | Vinegar et al. |
| 2008/0110043 | A1 | 5/2008 | Carin et al. |
| 2008/0134540 | A1 | 6/2008 | Lasonde |
| 2008/0152782 | A1 | 6/2008 | Avgoustopoulos et al. |
| 2008/0155985 | A1 | 7/2008 | Labrador |
| 2008/0172899 | A1 | 7/2008 | Carin et al. |
| 2008/0189979 | A1 | 8/2008 | Carin et al. |
| 2008/0217321 | A1 | 9/2008 | Vinegar et al. |
| 2008/0221772 | A1 | 9/2008 | Carin et al. |
| 2008/0289788 | A1 | 11/2008 | Pinkham, Jr. et al. |
| 2008/0309087 | A1 | 12/2008 | Evulet et al. |
| 2009/0000184 | A1 | 1/2009 | Garwood |
| 2009/0007484 | A1 | 1/2009 | Smith |
| 2009/0028767 | A1 | 1/2009 | Parker et al. |
| 2009/0183424 | A1 | 7/2009 | Gorbell et al. |
| 2009/0188127 | A1 | 7/2009 | Gorbell et al. |

FOREIGN PATENT DOCUMENTS

| | | |
|---|---|---|
| CN | 1035488 A | 9/1989 |
| DE | 4331932 | 3/1994 |
| EP | 0 428 015 | 5/1991 |
| EP | 0 298 941 B1 | 3/1992 |
| EP | 0 677 237 | 3/1997 |
| GB | 2 335 188 | 9/1999 |
| JP | 2001340828 | 12/2001 |
| WO | WO 95/29884 | 11/1995 |
| WO | WO 01/40644 | 6/2001 |
| WO | WO 02/42611 | 5/2002 |

OTHER PUBLICATIONS

Ernest et al., "Waste Heat Utilization for Dewatering Sewage Sludge," *Waste Heat Management and Utilization*, vol. 3, Edited by Lee et al., pp. 2443-2463, 1979.

Perdue AgriRecycle, LLC, Process, www.perdueagrirecycle.com/process.html 2006/2001.

Combined Heat and Power Quality Assurance, www.chpqa.com/html/notes.htm Guidance Notes 11 (2003), 12 (2004), 16 (2004) and Appendix 3 (2000).

Perdue AgriRecycle, LLC, Process, www.perdueagrirecycle.com/process.html, 2006/2001.

"From Feather to Feed Gas-Fired Flashdryers Create Profitable By-Products from Once-Costly Wastes," Industrial Processing, Natural Gas Applications in Business & Industry, pp. A2-A4 (Publicly known at least as early as Jul. 19, 2004).

How Milorganite is Made, 1 page (Aug. 4, 2004).

Material Safety Data Sheet Milorganite® 5-2-0 Organic Nitrogen Fertilizer, pp. 1-4 (Sep. 13, 2007).

Material Safety Data Sheet Milorganite® 6-2-0 Fertilizer, pp. 1-4 (May 29, 2007).

Material Safety Data Sheet Milorganite® GardenCare 6-2-0 Fertilizer, pp. 1-4 (May 29, 2007).

Milwaukee home of Milorganite, http://www.retrocom.com/retromilw/milorg.htm, 3 pages (Date Printed Mar. 17, 2008).

Milorganite Our History, http://www.milorganite.com/about/history.cfm, 2 pages (Copyright 2008).

Milorganite—Wikipedia, the free encyclopedia, http://en.wikipedia.org/wiki/Milorganite, 1 page (Mar. 1, 2008).

Miscellaneous pages from Duske Engineering.com, http://www.duskeengineering.com, 11 pp., (Jun. 2004).

Partanen, William E., P.E., Amani VOC/HAP's Mitigation System An Innovative Method of Destroying VOC/HAP's That Provides an Attractive Return on Investment, pp. 1-12, Neill and Gunter (Jan. 2004).

Scott A.S.T. Drying System, Scott Equipment Company, 6 pages (Publicly known at least as early as Feb. 13, 1995).

Transcript of audio track of DVD: "Legal Alfalfa Presents—Alfalfa the Remarkable Product," from Legal Alfalfa Products Ltd., Legal, Alberta, Canada (circ. 2004), www.alfatec.ca.

Fairfield, D, "Pelleting Cost Center," In: R. R. McEllhiney (Ed.) Feed Manufacturing Technology IV, pp. 111-130, Am. Feed Ind. Assoc., Inc., Arlington, VA (1994).

Leaver, R., "The Pelleting Process," Andritz Sprout, a Division of Andritz Inc., Muncy, Pennsylvania, pp. 1-49 (Undated).

Material Safety Data Sheet Milorganite® 6-2-0 Fertilizer, pp. 1-4 (Oct. 30, 2001).

Partanen, William, E., P.E., "VOC Destruction Using Combustion Turbines," pp. 1-9, Neill and Gunter (Sep. 2002).

* cited by examiner

CONTROL SYSTEM FOR GAS TURBINE IN MATERIAL TREATMENT UNIT

FIELD OF THE INVENTION

This invention relates to control systems for material treatment equipment systems which comprise a gas turbine engine or other internal combustion engine and a dryer vessel and which utilizes the engine exhaust gases to heat treat various materials in the dryer vessel.

BACKGROUND OF THE INVENTION

Gas turbine generator exhaust has been used for drying or processing various materials, but existing control systems for such equipment do not provide for efficient operation of such equipment. Typically, gas turbine generators are controlled for optimum fuel usage, water spray intake, engine life, electricity production or profitability based on these and other factors. Examples of gas turbine generator control systems are disclosed in U.S. Pat. No. 5,584,171 to Sato et al.; U.S. Pat. Nos. 6,125,633 and 6,173,508 to Strohmeyer; U.S. Pat. No. 6,748,743 to Foster-Pegg; U.S. Patent Applications 2004/0050069 by Willems et al.; 2004/0060277 by Hatamiya et al.; and 2004/0103068 by Eker et al., the disclosures of which are incorporated herein by reference in their entirety.

There is a need in the art for improved systems and methods for control of gas turbine and other engine operations in conjunction with the use of engine exhaust gases for treatment of materials.

SUMMARY OF THE INVENTION

In one aspect, this invention provides a material treatment apparatus comprising a gas turbine having combustion air and fuel inlets; a dryer vessel connected to and adapted for receiving exhaust gases from the gas turbine and adapted for receiving material for treatment in the dryer vessel with heat from the exhaust gases; a temperature sensor for detecting the temperature at a desired location in the dryer vessel; and a controller responsive to the temperature sensor for controlling the combustion air flow and/or the fuel flow to the turbine.

In another aspect, this invention provides a material treatment apparatus comprising a gas turbine having combustion air and fuel inlets; a dryer vessel connected to and adapted for receiving exhaust gases from the gas turbine and adapted for receiving material for treatment in the dryer vessel with heat from the exhaust gases; a temperature sensor for detecting the temperature of the heated material at a desired location in the dryer vessel or at a desired location downstream of the dryer vessel; and a controller responsive to the temperature sensor for controlling the combustion air flow and/or the fuel flow to the turbine.

In another aspect, this invention provides a method for controlling a material treatment apparatus comprising a gas turbine having a combustion air inlet and a fuel inlet and a dryer vessel connected to the gas turbine and having a temperature sensor therein and being adapted for receiving exhaust gases from the gas turbine and adapted for receiving material for treatment therein with heat from the exhaust gases, the method comprising: using the sensed temperature for controlling the combustion air flow and/or the fuel flow to the turbine.

In another aspect, this invention provides a method for controlling a material treatment apparatus comprising a gas turbine having a combustion air inlet and a fuel inlet; a dryer vessel connected to the gas turbine and adapted for receiving exhaust gases from the gas turbine and adapted for receiving material for treatment in the dryer vessel with heat from the exhaust gases; and a temperature sensor for sensing the temperature of the material at a desired location in the dryer vessel or downstream of the dryer vessel, the method comprising: using the sensed temperature for controlling the combustion air flow and/or the fuel flow to the turbine.

In all the above aspects, a reciprocating engine can be substituted for the gas turbine.

In another aspect, this invention provides a gas turbine engine comprising an exhaust connection adapted to transmit at least a portion of the turbine exhaust gases into a dryer vessel and adapted to substantially preclude introduction of outside air into the dryer vessel with the exhaust gases.

In another aspect, this invention provides a gas turbine engine comprising a fuel and/or combustion intake air controller adapted to be responsive to a temperature sensor positioned to sense the temperature at a desired location in a dryer vessel connected to and receiving exhaust gases from the gas turbine.

In another aspect, this invention provides a gas turbine engine comprising a fuel and/or combustion intake air controller adapted to be responsive to a temperature sensor positioned to sense the temperature at a desired location of material treated in a dryer vessel connected to and receiving exhaust gases from the gas turbine.

In another aspect, this invention provides a controller for a material treatment system, including a gas turbine or reciprocating engine having the exhaust connected to a dryer vessel which is adapted for treating material with heat from the exhaust, comprising: a programmable computer adaptable for processing information from sensors detecting preselected conditions of the gas turbine operation, the dryer vessel operation or the material before, during or after treatment in the dryer vessel; for prioritizing sensor inputs for control and for commanding actuators for combustion air or fuel flow to the gas turbine.

In all of the above aspects, the turbine engine or reciprocating engine can include an electric generator.

DESCRIPTION OF THE INVENTION

The present invention provides new technology and systems for the control of material treatment processes, apparatus and systems that comprise internal combustion engines, preferably gas turbine engines, connected to dryer vessels for treatment and/or conversion of material feedstocks to produce useful, recyclable or environmentally acceptable materials and products. In particular, these material treatment processes, apparatus and systems employ the combination of such engines and dryer vessels adapted such that the engine exhaust gases are directed into the dryer vessel to dry and/or heat treat a material introduced into and processed in the dryer vessel. Such processes, apparatus and systems and their uses are the subject matter of and are disclosed in commonly assigned copending U.S. Pat. No. 7,024,796, issued Apr. 11, 2006 and U.S. Pat. No. 7,024,800, issued Apr. 11, 2006, both filed on even date herewith, the disclosures of which are incorporated herein by reference in their entirety.

In the operation of the above material treatment systems, an efficient and preferred way of providing the hot gases for contact with the material feedstock treated in the dryer vessel is the exhaust from a gas turbine, and preferably from a gas turbine electric generator. The gas turbine is fueled from locally available conventional fuel sources, and the electricity produced from the gas turbine generator is preferably sold back into the local power grid as a revenue source for the operation. The electricity can be used internally in the operation of the material treatment system or in other nearby operations as a supplemental source of power. It is preferable and more efficient in the operation of the system to sell the electric power produced to the local power grid. This enables varying the operation of the material treatment process and equipment systems in the most efficient and effective manner for treatment of the material feedstock to produce the desired quality and quantity of products without concern for or being constrained by any particular minimum or necessary level of electricity output or the need for an unchanging level of electricity output.

An optional and preferred aspect of the above systems is that the gas turbine and the dryer vessel receiving the exhaust gas from the gas turbine are connected together such that induction of outside air into the dryer vessel is precluded and the dryer vessel preferably receives the exhaust gases directly from the gas turbine. It is preferred that 100% of the gas turbine exhaust gases are passed into the dryer vessel and, for most efficient operation, preferably without passing through any intervening heat exchanger, silencer or other equipment in order that the dryer vessel receives the maximum heating from the gas turbine exhaust. In this arrangement, the dryer vessel also serves as a silencer for the gas turbine, and efficient operation is achieved by not heating additional outside air along with the material being treated. But, it is recognized that excess exhaust gases not needed for the dryer vessel operation can be diverted to provide heat required in other steps in the material treatment systems or in other nearby operations.

The terms "material for treatment," "treated material," "material feedstock" and the like are used herein to mean and include the matter which is prepared for, fed into or processed in the dryer vessel forming a part of a material treatment process, apparatus or system referred to above, as more fully disclosed and described in the above referred two copending patent applications. The material is processed in the dryer vessel by contact with the engine exhaust gases or by heat provided from the engine exhaust gases.

The term "gas turbine" is used herein to mean and include any turbine engine having a compressor turbine stage, a combustion zone and an exhaust turbine stage that is capable of producing exhaust gas temperatures of at least 500° F., preferably at least about 700° F., more preferably at least about 900° F. and most preferably greater than about 1,000° F. Gas turbines are the heat source preferred for use with the dryer vessel in the material treatment systems because of their efficient operation and high heat output. The gas turbine generator is further preferred for use due to the production of energy by the generator, which energy can be utilized or sold to improve the economics of the material treatment operation. The generator will typically be an electric generator due to the convenience of using and/or selling the electricity produced. However, the generator can be any other type of energy generator desired, such as a hydraulic pump or power pack that can drive hydraulic motors on pumps, augers, conveyors and other types of equipment in the material treatment systems or equipment in other nearby operations. The heat requirements and the material treatment system economics will determine whether a gas turbine or gas turbine generator is used. If it is desired to have higher temperature exhaust gases and higher heat output from a given smaller size gas turbine, it may be desired to use a gas turbine instead of a similar size gas turbine generator. Compared to the gas turbine, the gas turbine generator further expands and cools the exhaust gases in absorbing energy to drive the generator, where in a gas turbine that energy is contained in higher temperature gases available for use in the dryer vessel of this invention. This can be an option when it is economically more important to have small portable high temperature material treatment units than to have the revenue stream or economic benefit of the electricity production.

The gas turbine or gas turbine generator useful in the material treatment system can be fueled from any available source with any suitable fuel for the particular gas turbine and for the process equipment employed. The preferred and conventional fuels are sweet natural gas, diesel, kerosene and jet fuel because the gas turbines are designed to run most efficiently on good quality fuels of these types and because of their common availability, particularly at remote agricultural operations, where the material treatment units are often located. However, other fuels that can be used to fuel the gas turbine include methane, propane, butane, hydrogen and biogas and bioliquid fuels (such as methane, oils, diesel and ethanol).

Examples of commercially available gas turbines and gas turbine generators useful in the material treatment systems include the following (rated megawatt (MW) outputs are approximate):

Rolls Royce Gas Turbine Engines Allison 501-KB5, -KB5S or -KB7 having a standard condition rated output of 3.9 MW European Gas Turbines Tornado having rated output of 7.0 MW Solar Mars 90 having rated output of 9.4 MW and Solar Mars 100 having rated output of 10.7 MW Solar Tarus 60 having rated output of 5.5 MW and Solar Tarus 70 having rated output of 7.5 MW For a nominal product output capacity of 2.5 metric tons/hr. (2,500 kg/hr) a gas turbine generator size of about 4 MW can be used, depending on the heat insulation and heat recovery efficiencies designed into the overall system. For small single semitrailer or truck systems, the units may be scaled smaller. For smaller product output systems, such as an 0.3 metric ton/hr product output, small gas turbines, such as Solar Saturn 0.8 MW, Solar Spartan 0.2 MW or Capstone 0.5 MW or 0.3 MW generators, can be used depending on system efficiencies and required heat input ranges. It will be recognized that the material treatment systems can also be designed to utilize the exhaust gas heat from reciprocating engines, such as gasoline or diesel engines, with or without electric generators.

The dryer vessel employed in the material treatment systems can be any type or configuration that is suitable for drying the material feedstock available and that can be adapted for receiving the gas turbine exhaust gases and receiving the material feedstock, preferably without allowing a significant amount of outside air to enter the drying chamber in the dryer vessel where the exhaust gases contact the material feedstock. A preferred design of the gas turbine exhaust connection to the dryer vessel is to preclude any significant outside air from entering the dryer vessel thereby preventing any significant oxidation of the material feedstock. Alternate sources of hot gases other than a gas turbine can be used and connected to the dryer vessel, such as the exhaust from conventional oil or gas burners and reciprocating engines. Such an alternate and additional source of hot gases can optionally be connected to the dryer vessel and be used to supplement the exhaust output of the gas turbine in order to provide additional heat input capacity for the dryer vessel, if needed for start up, shut down or surge load conditions or for backup in the event the gas turbine goes off line.

The types of dryer vessels that can be used in the material treatment systems includes, for example, the following:

- Rotary drum with or without internal scrapers, agitation plates and/or paddles
- Stationary "porcupine" drum dryer with or without scrapers and/or agitator plates and/or paddles
- Triple pass stepped drying cylinder or rotary drum dryer systems with or without scrapers and/or agitator plates and/or paddles
- Rotary drum dryer systems with or without steam tubes and with or without scrapers and/or agitator plates and/or paddles
- Turbo-dryer or turbulizer systems
- Conveyor dryer systems with or without scrapers and/or agitator plates and/or paddles
- Indirect or direct contact dryer systems with or without scrapers and/or agitator plates and/or paddles
- Tray dryers
- Fluid bed dryers
- Evaporator systems
- Baking ovens Examples of commercially available dryer vessels useful in or that can be adapted for use in the material treatment systems include:

- Scott AST Dryer™ Systems
- Simon Dryer Ltd.—Drum dryers
- Wyssmont Turbo Dryer systems
- Duske Engineering Co., Inc.
- Energy Unlimited drying systems
- The Onix Corporation dehydration systems
- International Technology Systems, Inc. direct or indirect dryer systems
- Pulse Drying Systems, Inc.
- MEC Company dryer systems Further examples of dryer vessels useful in or that can be adapted for use in the material treatment systems are disclosed in U.S. Pat. No. 5,746,006 to Duske et al. and U.S. Pat. Nos. 5,570,517 and 6,367,163 to Luker, the disclosures of which are incorporated herein by reference in their entirety.

The term "dryer vessel" is not limited to a drying function and the "dryer vessel" equipment does not necessarily always function primarily as a dryer by removing moisture from the material being treated. In addition to or instead of drying or moisture removal, the dryer vessel also functions as the thermal treatment/conversion/alteration vessel or oven in which the material feedstock is heated to sufficient temperatures for sufficient times to produce the conversion to desired final materials and products. In addition, the dryer vessel need not provide direct contact of the turbine exhaust gases or other heat source and the material feedstock, but can provide indirect heating of the material feedstock to achieve the drying and/or thermal treatment/conversion/alteration desired. Various configurations of gas turbines and dryer vessels can be used in the material treatment systems. For example, two dryer vessels can be operated in series where a high water content material feedstock is dried in the first dryer vessel then the output from the first dryer vessel is thermally treated in the second dryer vessel to achieve the desired chemical or physical conversion or alteration. In such an arrangement, the exhaust gases can be supplied from a single gas turbine exhaust split between the two dryer vessels, or can be supplied by two separate gas turbines. From this example it can be seen that the material treatment processes, apparatus and systems can be adapted to operate various equipment components in series or in parallel to perform various processing functions desired to achieve the effective and economic operation of the material treatment system.

Another aspect of the dryer vessel adapted for use in the material treatment system is that the dryer vessel preferably also functions as the silencer for the gas turbine or other engine providing the hot exhaust gases. It is well known that gas turbines (essentially jet aircraft engines) produce a high level of noise impact on the nearby environment. Stationary gas turbines used for electric power production or other purposes are usually required by local, state and federal regulations to have silencers installed to muffle the noise of the exhaust of the gas turbine to acceptable levels. Such silencers have the economic disadvantages of cost and creating back pressure on the gas turbine exhaust, which reduces the efficiency of the gas turbine operation. Due to the connection between the gas turbine exhaust and the dryer vessel preferably being closed to outside air, is that the dryer vessel functions effectively as a silencer for the gas turbine. This is at least in part a result of the internal configuration construction of the dryer vessel acting in combination with the presence of the high water content material feedstock, which combination is effective in absorbing and muffling the gas turbine exhaust noise. This is also due to the downstream end of the dryer also being closed to the atmosphere, because the steam and off gases from the dryer vessel are collected for condensation, cleaning, recycling and for heat recovery in the downstream processing in a closed system before being vented to the atmosphere. In addition, due to the closed system, the dryer vessel and downstream equipment can be operated at reduced pressure to eliminate the back pressure on the gas turbine exhaust.

Another advantage provided by these material treatment systems results from the contact of the gas turbine exhaust gas with the material feedstock in the confined space of the dryer vessel without significant outside air present. The $NO_x$ and $SO_x$ emissions, and to some extent CO and $CO_2$ emissions, in the gas turbine exhaust are substantially reduced, and in some cases reduced to zero, by absorbing or complexing of the $NO_x$ and $SO_x$ components into the material feedstock as it is treated, where they remain absorbed, complexed or fixed in the dried or treated material exiting the dryer vessel and in the product after processing into granular, pellet or prill or other form. This provides the advantage, e.g., when a fertilizer product is being produced, of both lowering or eliminating the emissions of $NO_x$ and $SO_x$ (and $CO/CO_2$) into the atmosphere and adding the nitrogen, sulfur and carbon components to the nutrient value of the product produced by the material treatment system.

The typical turbine exhaust gas temperature entering the dryer vessel will be in the range of about 500° F. to about 1,500° F., depending on moisture and other content of the material feedstock and the desired condition of the treated material product output from the dryer vessel. In smaller systems with smaller engines, the dryer vessel inlet exhaust gas temperature can be as low as about 300° F. or about 350° F. A preferred range is from about 600° F. to about 1200° F., and it is more preferred that the inlet temperature be at least about 650° F. and most preferably at least about 700° F. The temperature and flow rate of the gas entering the dryer vessel will depend in part on the moisture content and other properties of the material feedstock. Higher moisture content will obviously generally require higher inlet gas temperatures to reduce the moisture content. An additional process efficiency is achieved in the material treatment systems where high moisture content material feedstock is contacted with high temperature exhaust gases. Such contact causes the formation, sometimes instantly, of superheated steam as the moisture comes out of the material feedstock, then that superheated steam heats and drives the moisture out of adjacent material feedstock. It is believed that this mechanism is responsible for quick drying of the material feedstock to a low moisture content so that the remaining residence time of the material feedstock in the dryer vessel contributes to the desired thermal treatment/conversion/alteration or "cooking" of the material to achieve the desired product. Some material feedstocks may require lower temperatures but longer residence time to achieve the conversion or "cooking" needed to produce a product having desired properties. The temperature of the material exiting the dryer vessel will typically be in the range of about 150° F. to about 450° F. and preferably between about 200° F. and about 350° F. In some operations, the dryer vessel exit temperature of the material should be at least about 175° F. and preferably at least about 200° F.

The material feedstock typically will have a moisture content between about 50% and about 90% by weight, preferably between about 60% and about 80% by weight and most preferably between about 65% and about 75% by weight. (Percent by weight, as used herein, is in reference to percent of the component in question based on the total weight of the mixture referred to.) Although material feedstock of lower moisture content, for example, as low as about 40% by weight or even 30% by weight can be processed in the treatment systems. The preferred material feedstock has a moisture content of at least about 50% by weight, more preferably at least about 60% and most preferably at least about 70% by weight. The temperature of the material feedstock will typically be ambient, i.e., in the range of about 30° F. to about 100° F., but can be lower than 30° F., provided that any frozen agglomerations do not interfere with the feedstock preparation or the operation of the dryer vessel and feedstock feeder equipment. The material feedstock may be used at any temperature direct from a manufacturing facility or from a process unit, which may be at an elevated temperature. The economics of the systems of this invention are usually improved if the material feedstock is at an elevated temperature or is preheated prior to introduction into the dryer vessel.

The output from the dryer vessel comprises a gas phase comprising steam, water vapor, combustion gases and a solids phase comprising the treated material dried and/or thermally treated and converted to desired forms. Typical dryer vessel outlet temperatures of the gases and/or solids will normally range from about 200° F. to about 350° F., but lower or higher temperatures may be selected and/or desired for economic, product quality and/or process efficiency reasons. The outlet temperatures can be from at least about 110° F. to at least about 500° F., preferably at least about 180° F. and more preferably at least about 200° F. It is generally desired that the solids material exiting the dryer vessel will generally have a moisture content between about 10% and about 15% by weight, but can range from about 5% to about 25% by weight. Again, lower (near zero) or higher moisture content of the dryer vessel output solids may be selected and/or desired for similar reasons. The steam, water vapor and combustion gases exiting the dryer vessel will normally be routed through heat exchangers (for recovery of process heat usable downstream in granulating or pelletizing operations or upstream in feedstock or turbine intake air preheating), condensers (for recovery of process water for upstream or downstream use, for industrial application or for disposal), scrubbers, filters or cyclones (for recovering solids entrained in gases or liquids and rendering gases and liquids environmentally acceptable for release) and other conventional process equipment.

The present invention comprises the combination of material, process and equipment condition sensors deployed in the above material treatment systems and a controller for the gas turbine engine. The sensors useful in this invention are primarily temperature, moisture content and flow rate sensors, but can also include other sensors, such as pressure, pH and chemical (e.g., $CO$, $CO_2$, etc.) sensors. The sensors are primarily deployed to measure conditions of the material being treated and conditions of or inside the equipment used in the material treatment systems, but can also include other sensors, such as ambient air temperature and wind velocity, fuel temperatures, etc. The types of sensors to be used will be apparent to one skilled in the art and include mechanical, infrared, magnetic, electric, piezoelectirc and other conventional and state of the art sensors available for measuring the desired conditions at the desired points in the system. The sensors can communicate with the controllers mechanically, electrically, remotely by RF or infrared or in other conventional ways.

The controllers useful in this invention are primarily for the gas turbine engine combustion air intake and fuel flow, but can also include controllers for intake water injection, such as water mist injection conventionally used in gas turbine engine intake, stator vane or guide vane angle adjustment, air or fuel preheaters and other parameters that control the running conditions of the gas turbine engines and/or the power output and exhaust gas temperatures and volumes. As noted above the sensors and controllers are adapted to communicate as appropriate so that the controllers respond to the sensors and sensed conditions as needed for process control according to this invention. While the controllers are discussed and illustrated with respect to gas turbine engines, it will be apparent to one skilled in the art to apply and adapt same to reciprocating engine control.

Figure 1:
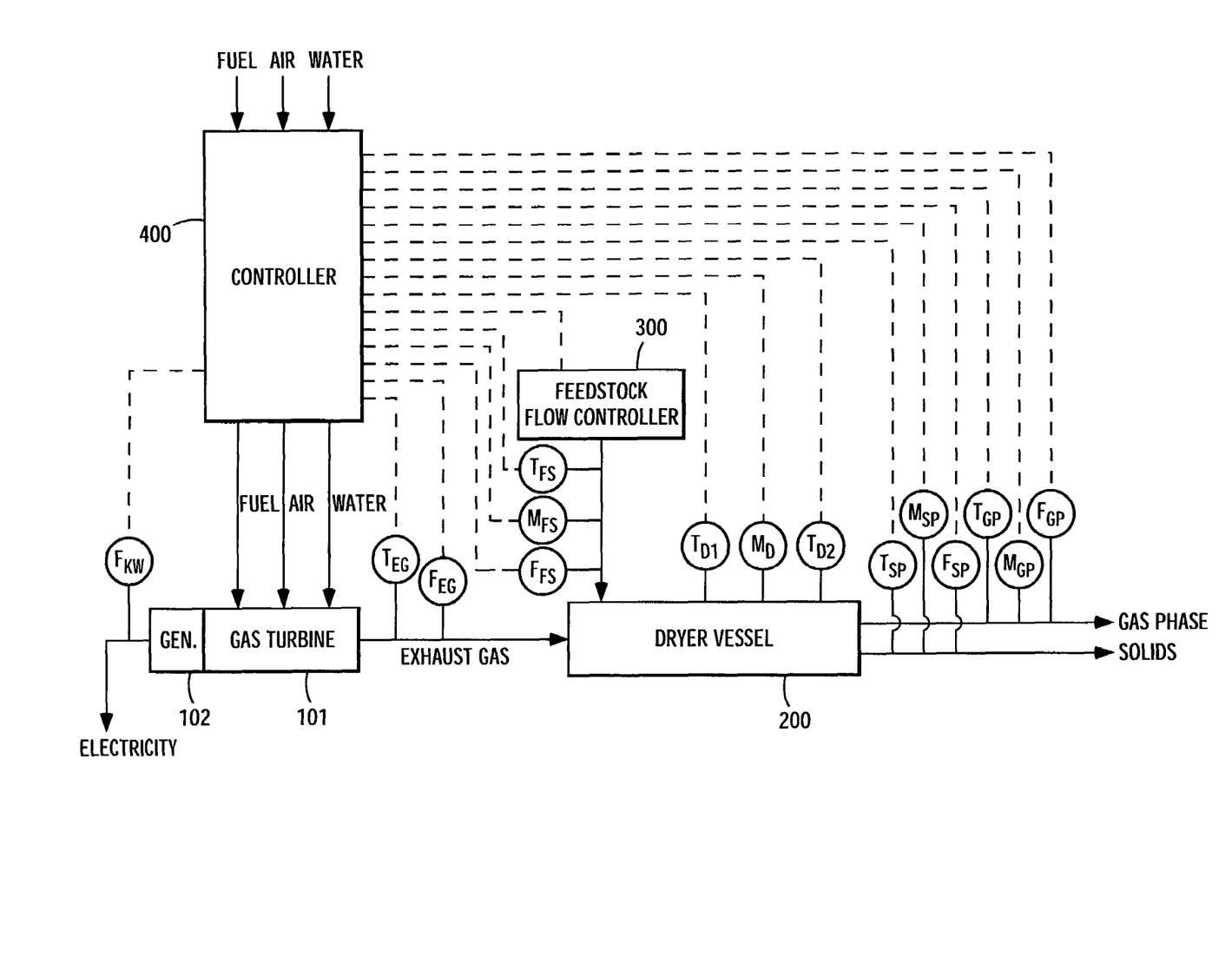
The drawing is a schematic diagram illustration of an embodiment of the control systems and components of the present invention.

This invention is further illustrated in reference to the drawing, which shows by example gas turbine generator 101/102 with fuel, air and water inlets producing exhaust gas that is directed into dryer vessel 200 and electricity. Dryer vessel 200 also has inlet for the material feedstock from feedstock flow controller 300. The control system and methods of this invention are illustrated by controller 400 which controls actuators for the fuel, air and water feed to the gas turbine and which communicates with and is selectively responsive to the various temperature sensors, T, moisture content sensors, M, and/or flow rate sensors, F. The controller preferably comprises a programmable computer of the type conventionally used in process plant control systems wherein the control priorities and input/output criteria can be set and changed as appropriate for different equipment, different material feedstock, different material treatment desired and other variables. For example, the controller can be set to control the air and fuel (and optionally water) feed to the gas turbine in response to the temperatures $T_{D1}$ or $T_{D2}$ in the dryer vessel so that as feedstock load increases and the temperature drops, the controller increases the air and fuel to the gas turbine to increase the temperature and/or volume of exhaust gas entering the dryer vessel. Alternatively, the controller can be set to respond to the temperature $T_{SP}$ of the solid phase treated material output from the dryer vessel. In such case, the sensor inputs from $T_{D1}$ or $T_{D2}$ may be used for upper limit control so the dryer vessel does not overheat. Similarly the gas turbine exhaust gas temperature $T_{EG}$ can be used for upper limit safety and equipment protection control. One objective of the control system of this invention is to have the gas turbine operation singularly or primarily responsive to the heat requirements in the dryer vessel to provide the desired heating for desired treatment by drying and/or conversion of the feedstock material being processed.

As will be apparent to one skilled in the art applying the control system this invention to the material treatment system and equipment, an intelligent, anticipatory or predictive control program can be used. In order to reduce the lag time from sensing heat requirements, for example from $T_{SP}$, the control system can integrate all available data regarding incoming feedstock temperature $T_{FS}$ in order to anticipate what the heat requirement will be in the dryer vessel for that feedstock and adjust the gas turbine power settings to anticipate the heat requirement when the desired volume feedstock enters the dryer vessel. Similarly other sensor inputs, comprising the exhaust gas flow rate $F_{EG}$, the moisture level at any point in the dryer vessel $M_D$, the flow rate of the treated solids product $F_{SP}$ and the temperature $T_{GP}$, moisture content $M_{GP}$ and flow rate $F_{GP}$ of the gas phase exiting the dryer vessel, can be used for integrated, predictive process control or merely as operating limits for safety, product quality, efficiency or other consideration. Other inputs can be used as well to achieve desired or optimum overall system efficiency and profitability, including fuel prices, electricity prices, seasonal product demand and pricing and the like. For example, spot fuel and electricity pricing can vary during the day or from day to day. The controller of this invention can provide system operation at minimum fuel cost times and maximum electricity price times to maximize profitability, because the material to be treated can often be stockpiled then processed and treated at the most economically favorable times.

In a most preferred embodiment controller 400 will also communicate with and act as secondary control of the feedstock flow controller 300 to achieve balanced operation. While the feedstock flow will normally be set manually to a desired production throughput of the material treatment system, it will be advantageous to have controller 400 adjust controller 300 toward the desired throughput while keeping the system balanced to provide desired temperatures and desired material treatment conditions in the system.

As described above, various other sensor input sources not shown on the drawing can be utilized to further enhance the anticipatory or predictive function of the control system of this invention, such as ambient air temperature and wind velocity, rainfall monitor, etc., which may affect heat load requirement in the material treatment system. The electricity production $F_{KW}$ is illustrated in the drawing, but will not normally be an operating input parameter or limit. However, the controller can monitor $F_{KW}$ for revenue source from electricity sales and, in the event the material treatment system is off line but electricity generation is desired, the gas turbine generator 101/102 can be controlled by the controller 400 in a conventional manner based on $F_{KW}$.

Finally, it will be recognized that in the control system of this invention the gas turbine need not be controlled for optimum gas turbine operation, such as for minimum $NO_x$ and $SO_x$ emissions in some material treatment operations, because the $NO_x$ and $SO_x$ will be captured and absorbed in the treated material. However, in other operations, it may be imperative to minimize $NO_x$ and $SO_x$ in the gas turbine exhaust because it is undesirable or not permitted to have $NO_x$ and $SO_x$ absorbed in the treated product. The control system of this invention can be operated to meet all of these requirements and others. Similarly, fuel efficiency of the gas turbine may not be important compared to the heat or other requirements of the material treatment system operation or compared to the overall economics of the material treatment system. The control system of this invention can be operated to prioritize any desired aspect or operational parameters of the material treatment system.

As will be apparent to one skilled in the art, the material treatment system can comprise multiple gas turbines, other engines and/or burners of the same or varying types and sizes can be manifolded together to feed multiple dryer vessels of the same or varying types and sizes in a single installation. This can be done to not only provide increased feedstock processing capacity but also to provide operational flexibility for processing varying feedstock loads and for performing equipment maintenance without shutting down the operation. The control system of the present invention can be adapted to control multiple engines in response to sensors measuring conditions in and resulting from material treatment in multiple dryer vessels.

While we have illustrated and described various embodiments of this invention, these are by way of illustration only and various changes and modifications may be made within the contemplation of this invention and within the scope of the following claims.

We claim:

1. A material treatment apparatus comprising:
   a gas turbine having combustion air and fuel inlets;
   a dryer vessel connected to and adapted for receiving exhaust gases from the gas turbine and adapted for receiving feedstock material for treatment in the dryer vessel with heat from the exhaust gases, wherein the treated material output of the dryer vessel includes a gas phase and a solid phase;
   a first temperature sensor for detecting the temperature of the exhaust gases entering the dryer vessel;
   a first flow rate sensor for detecting the flow rate of the exhaust gases entering the dryer vessel;
   a second temperature sensor for detecting the temperature of the feedstock material entering the dryer vessel;
   a first moisture content sensor for detecting the moisture level of the feedstock material entering the dryer vessel;
   a second flow rate sensor for detecting the flow rate of the feedstock material entering the dryer vessel;
   a third temperature sensor for detecting the temperature within the dryer vessel;
   a second moisture content sensor for detecting the moisture level within the dryer vessel;
   a fourth temperature sensor for detecting the temperature of the solid phase treated material output from the dryer vessel;
   a fifth temperature sensor for detecting the temperature of the gas phase treated material output from the dryer vessel;
   a third moisture content sensor for detecting the moisture level of the solid phase treated material output from the dryer vessel;
   a fourth moisture content sensor for detecting the moisture level of the gas phase treated material output from the dryer vessel;
   a third flow rate sensor for detecting the flow rate of the solid phase treated material exiting the dryer vessel;
   a fourth flow rate sensor for detecting the flow rate of the gas phase treated material exiting the dryer vessel; and
   a controller responsive to at least one of the temperature sensors, the flow rate sensors, and the moisture content sensors for controlling the flow rate of the feedstock material entering the dryer vessel, wherein the controller is also responsive to at least one of the temperature sensors, the flow rate sensors, and the moisture content sensors for controlling the combustion air flow into the combustion air inlet of the gas turbine or the fuel flow into the fuel inlet of the gas turbine.

2. An apparatus according to claim 1, wherein the gas turbine comprises a gas turbine generator.

3. An apparatus according to claim 1, wherein the controller is responsive to at least one of the fourth temperature sensor and the fifth temperature sensor for controlling the flow rate of the feedstock material entering the dryer vessel.

4. An apparatus according to claim 3, wherein the controller is also responsive to at least one of the third moisture content sensor and the fourth moisture content sensor for controlling the flow rate of the feedstock material entering the dryer vessel.

5. An apparatus according to claim 3, wherein the controller is also responsive to the first temperature sensor for controlling the flow rate of the feedstock material entering the dryer vessel, wherein the controller is primarily responsive to at least one of the fourth and fifth temperature sensors and secondarily responsive to the first temperature sensor.

6. An apparatus according to claim 1, wherein approximately 100% of the exhaust gases from the gas turbine are passed into the dryer vessel.

7. An apparatus according to claim 1, wherein the gas turbine produces exhaust gases of at least about 700° F.

8. An apparatus according to claim 1, wherein the connection between the gas turbine and the dryer vessel is closed to outside air.

* * * * *